United States Patent Office 3,261,793
Patented July 19, 1966

3,261,793
VINYLIDENE POLYMER FILMS WITH MIXTURES OF MgO AND EPOXIDIZED SOYBEAN OIL
Fred Stevenson, Bay City, Mich., assignor to The Dow Chemical Company, Midland, Mich., a corporation of Delaware
No Drawing. Filed May 20, 1963, Ser. No. 281,525
8 Claims. (Cl. 260—23.7)

This invention relates to polymeric compositions and, in particular, to polymeric compositions based on vinylidene chloride polymers and copolymers.

Polymers and copolymers of vinylidene chloride with such comonomers as acrylonitrile, vinyl chloride, and lower alkyl acrylates have found wide use as films for packaging of foodstuffs and other articles. Such films possess many useful properties, such as inertness, ability to be heat sealed, transparency, shrinkability, and low water vapor transmission rates, which are desirable for packaging foodstuffs. However, the prior vinylidene chloride polymer films suffered the disadvantage of becoming brittle and losing strength and other qualities at low temperatures. Prior art attempts to plasticize these copolymers have not generally been successful in overcoming those problems. The compatibility of liquid plasticizers with vinylidene chloride polymers is restricted which limits low temperature flexibility. Such liquid plasticizers also have a tendency to bleed out of the composition which is undesirable for packaging of certain foods. It has been found that the addition of certain rubber-like polymeric modifiers to the vinylidene chloride polymers and copolymers, effectively enhances the low temperature properties of films and other articles produced therefrom. However, such compositions become unstable on prolonged exposure to heat, and it is necessary to incorporate stabilizers in the compositions to be extruded. Such stabilizers must, necessarily, be odorless and must not exude from the finished film or other article. In addition, any such agents in the composition must be non-toxic.

Accordingly, it is a principal object of this invention to provide polymeric compositions based on polymers of vinylidene chloride, which compositions are suitable for making essentially odorless, non-toxic, non-exuding films and other articles which retain their flexibility and other properties at low temperatures, such as are encountered in refrigerated foodstuffs and frozen foodstuffs.

The polymeric composition of this invention comprises a blend of (I) from about 70 to 95 percent by weight of the composition of a normally crystalline polymer consisting of (a) 70 to 100 percent by weight of vinylidene chloride and (b) 0 to 30 percent by weight of at least one monoethylenicaly unsaturated comonomer, (II) from about 5 to 30 percent by weight of the composition of a rubber-like polymeric modifier compatible with the normally crystalline polymer, and (III) at least about 0.50 percent by weight in the aggregate, based on the total weight of the composition, of a stabilizer mixture consisting of (1) from about 0.25 to 0.75 percent by weight of an oxide of a metal of Group II of the Periodic Table and (2) at least about 0.25 percent by weight of an ester of a higher fatty acid containing from about 8 to 22 carbon atoms, wherein the higher fatty acid group contains from about 2 to 10 percent epoxy oxygen, and the alcohol group of the ester is selected from the group consisting of aliphatic alcohols, cycloaliphatic alcohols, aryl alcohols and aralkyl alcohols.

The normally crystalline vinylidene chloride polymers usable in this invention are well known and may be prepared by interpolymerizing vinylidene chloride with known comonomers. Typical of the normaly crystalline polymeric materials falling within the advantageous definition are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric compositon will also be known.

The rubber-like polymeric modifiers which impart low temperature flexibility to articles made from the vinylidene chloride polymer may be selected from a wide variety of polymeric materials. For example, one such class of interpolymers includes the copolymers of (1) 70 to 95 percent by weight of an open chain aliphatic conjugated diolefin having from 4 to about 9 carbon atoms, such as butadiene or isoprene, with (2) from 30 to 5 percent by weight of a lower alkyl-lower alkenyl ketone, such as methyl isopropenyl ketone, ethyl vinyl ketone, and methyl vinyl ketone. The contemplated copolymers are rubber-like elastomers. Such elastomers have a Mooney viscosity at 212° F. of 10 to 140, preferably in the range of 30 to 70. These copolymers are known and may be prepared by copolymerizing the monomers in aqueous emulsion as, for example, by the procedure disclosed in U.S. Patent 2,897,167.

Another class includes the copolymers of (1) 70 to 95 percent by weight of an open chain aliphatic conjugated diolefin having from 4 to about 9 carbon atoms, such as butadiene or isoprene, with (2) from 30 to 5 percent by weight of a lower alkyl alkacrylate having from 1 to about 4 carbon atoms in the alkyl ester group and 1 to 2 carbon atoms in the alpha alkyl group including for example isopropyl methacrylate, butyl methacrylate, methyl ethacrylate, ethyl ethacrylate, and propyl ethacrylate. The contemplated copolymers are rubber-like elastomers. Such elastomers have a Mooney viscosity at 212° F. of 11 to 146 and preferably in the range of 30 to 70. The rubber-like copolymers are known and may be prepared by copolymerizing the monomers in aqueous emulsion, as for example, by the procedure as generally disclosed in U.S. Patent 2,462,354.

Still another class is the terpolymers of (1) 70 to 95 percent by weight of an open chain aliphatic conjugated diolefin having from 4 to about 9 carbon atoms, such as butadiene or isoprene, and (2) 5 to 30 percent by weight of a blend of lower alkyl-lower alkenyl ketones, such as methyl isopropenyl ketone, ethyl vinyl ketone, and methyl vinyl ketone and lower alkyl alkacrylates, such as methyl methacrylate, isopropyl methacrylate, butyl methacrylate, methyl ethacrylate, ethyl ethacrylate, and propyl ethacrylate. The contemplated terpolymers are rubber-like elastomers. Such elastomers have a Mooney viscosity at 212° F. of about 1 to 146, preferably in the range of about 30 to 70. The rubber-like terpolymers are known and may be prepared by copolymerizing the monomers in aqueous emulsion, as for example, by the procedure as generally disclosed in U.S. Patent 2,462,354.

Yet another class are synthetic rubber-like materials obtained by the polymerization of the conjugated diolefin hydrocarbons selected from the group consisting of 1,3-butadiene and 2-methyl-1,3-butadiene, or isoprene.

The contemplated rubbery materials, advantageously having a Mooney viscosity at 212° F. of between about 30 and 150, and preferably between 30 and 120, may be prepared by procedures well known in the art.

The useful interpolymers may also be chosen from the copolymers of (1) 70 to 95 percent by weight of an open chain aliphatic conjugated diolefin having from 4 to about 9 carbon atoms, such as butadiene or isoprene, with (2) from 30 to 5 percent by weight of acrylonitrile. The contemplated copolymers are rubberlike elastomers. Such elastomers have a Mooney viscosity at 212° F. of 11 to 146, and preferably in the range of 30 to 70. The rubber-like copolymers are known and may be prepared by copolymerizing the monomers in aqueous emulsion, as for example, by the procedure as generally disclosed in U.S. Patent 2,462,354.

The interpolymers are also illustrated by the copolymers of (1) about 15 to 95 percent by weight butadiene-1,3 and (2) complementarily, from about 85 to 5 percent by weight of one or more copolymerizable monovinyl aromatic compounds of the benzene series. Examples of suitable monovinyl aromatic compounds are styrene, vinyltoluene, vinylxylene, ethylvinyl benzene, isopropylstyrene, ar-ethylvinyltoluene, chlorostyrene, dichlorostyrene, ethylchlorostyrene, ar-chlorovinyltoluene, and diethylstyrene, or suitable mixtures thereof.

The beneficial effects of the invention are obtained when the polymeric composition, as herein defined, is admixed with at least about 0.5 percent by weight in the aggregate, based on the total weight of the composition, of a stabilizer mixture consisting of (1) from about 0.25 to 0.75 percent by weight of an oxide of a metal of Group II of the Periodic Table and (2) at least about 0.25 percent by weight of an ester of a higher fatty acid group containing from about 8 to 22 carbon atoms, and wherein the higher fatty acid group contains from about 2 to 10 percent epoxy oxygen, as hereinafter described.

Illustrative of the oxides of the metals of Group II of the Periodic Table which are advantageously employed for the purposes of the present invention are the oxides of magnesium, calcium, barium, or cadmium. Such compounds must be employed in the herein stated amounts, i.e., less than about 0.25 percent by weight is insufficient to prevent the development of odor in films and other articles prepared from the defined polymeric compositions, and amounts in excess of about 0.75 percent by weight deleteriously affect the clarity of such articles. It is preferable that the average particle size of the compound be less than about 1 micron in order that a uniform dispersion may be obtained and the resulting product be thermally stable and transparent.

The esters of higher fatty acid groups containing from about 8 to 22 carbon atoms which are advantageously employed in conjunction with the hereinbefore defined compounds of Group II of the Periodic Table are; the aliphatic and cycloaliphatic, aryl and aralkyl esters of an epoxy fatty acid, wherein the fatty acid group contains from about 2 to 8 percent epoxy oxygen. The fatty acid group may be derived from any animal, vegetable, or marine oil containing unsaturated fatty acid groups; they may be derived from the mixed fatty acids contained in such oils; or may be derived from isolated unsaturated fatty acids. A wide variety of alcohol groups may be used for esterification of the epoxy fatty acid. These alcohols include those having a hydrocarbon group attached to the hydroxyl group and include particularly monohydric aliphatic alcohols such as methyl, ethyl, propyl, butyl alcohols and the like; polyhydric alcohols such as the glycols, diethylene glycol, and the like; glycerols and polyglycerols, etc. The alcohols used for esterification also include the aromatic alcohols such as phenol; and cycloaliphatic alcohols such as cyclohexanol. At least about 0.25 percent by weight of such materials must be employed in conjunction with the hereinbefore defined compounds of the metals of Group II of the Periodic Table, to obtain essentially odorless, non-exuding and transparent film and other articles from the indicated polymeric compositions. Amounts of such esters of higher fatty acid group in excess of about 2 percent by weight are generally unnecessary for the purposes of the present invention, however.

The polymeric blends of the invention may include plasticizers, such as dioctyl phthalate, dibutyl sebacate, and the like, in the range conventionally employed for compositions to be thermally fabricated, usually from about 2 to 10 percent by weight of the composition. The polymer blend may also include antioxidants, light stabilizers, and other additives known in the art which do not deleteriously affect the properties of the film.

The polymer blends of the invention are preferably prepared by mixing latexes of the vinylidene chloride polymers and of the rubber-like polymeric modifier in the proper proportions, coagulating the latex blend with alum or other known coagulants and recovery of dried polymer as is known in the art, followed by the subsequent admixing of the required amounts of the herein defined stabilizer mixture with such polymeric blend. The polymer blends may then be thermally extruded in tube form, supercooled, stretched, and oriented by the bubble technique and slit to form films as is known in this art. The compositions are useful in other processes, such as molding, slot extrusion, and other thermal fabrication techniques, to form films, fibers, foils, molded articles, and other forms having the superior properties.

The products of this invention will be illustrated with the following example in which all percentages and parts are by weight.

EXAMPLE

A latex containing about 34 percent solids of a crystalline copolymer composed of 73 percent by weight vinylidene chloride and 27 percent by weight vinyl chloride was prepared by emulsion polymerization utilizing a mixture of potassium persulfate and sodium bisulfite as the catalyst, and an alkylbenzene sodium sulfonate available commercially as "Ultrawet DS" as the emulsifier, in a manner well known in the art. Thereafter, in each of a series of experiments individual portions of such latex were separately blended with a similarly prepared latex containing about 45 percent solids of a rubber-like copolymer composed of about 80 percent by weight butadiene and 20 percent by weight methyl methacrylate in amounts sufficient to provide a polymeric composition containing about 88 percent of the herein defined vinylidene chloride copolymer and, complementarily, about 12 percent by weight of the herein defined butadiene/methyl methacrylate copolymer.

The latex blends were then individually coagulated and dried, and the polymer blend recovered. To each blend was then separately added 7 percent by weight of dibutyl sebacate as a plasticizer, and from 0.50 to 2.75 percent by weight of a stabilizer mixture composed of from 0.25 to 0.75 percent by weight of MgO and correspondingly, from 0.25 to 2 percent by weight of an epoxidized soybean oil having an epoxy oxygen content of at least about 6.0 percent, which is available commercially as "Paraplex G–60."

The polymer blends were then individually thermally extruded using standard bubble techniques into oriented films having a thickness of about 0.001 inch, and subsequently placed in a circulating air oven operating between about 80 and 85° C. for a period of up to 7 days.

For purposes of comparison, individual films containing 7 percent dibutyl sebacate and between 0.5 and 1.5 percent by weight of MgO as the stabilizer were prepared and heat-treated as described herein.

In other comparisons, individual films containing 7 percent dibutyl sebacate and between 0.5 and 1.5 percent by weight of "Paraplex G–60" were prepared and heat-treated as described herein.

The following table illustrates the composition of the stabilizer mixture and the results of the physical properties determined on the above-described oriented films. The column headings of such table have the following meanings.

Clarity:
 A—Initial visual rating of extruded oriented film.
 B—Hours exposure at 85° C. in a circulating air oven required to develop unacceptable color.
Odor: Hours exposure at 80° C. in a circulating air oven required to develop an unacceptable odor level.

Table

ORIENTED FILMS

| Run No. | Stabilizer | | Properties of Oriented Film | | |
|---|---|---|---|---|---|
| | MgO, Percent | Paraplex G–60, Percent | Clarity | | Odor (Hours at 80° C.) |
| | | | A (Initial) | B (Hours at 85° C.) | |
| For Comparison: | | | | | |
| 1 | 0.25 | | Good | <24 | <48 |
| 2 | 0.50 | | Good | <24 | <48 |
| 3 | 1.0 | | Fair | <24 | 48 |
| 4 | 1.5 | | Fair | <24 | 48 |
| 5 | | 0.5 | Good | <24 | 0 |
| 6 | | 1.0 | Good | <24 | 0 |
| 7 | | 1.5 | Good | <24 | 0 |
| This invention: | | | | | |
| 8 | 0.25 | 0.25 | Good | <24 | 48 to 96 |
| 9 | 0.25 | 0.5 | Good | 24 | 48 to 96 |
| 10 | 0.5 | 0.5 | Good | 24 | >120 |
| 11 | 0.5 | 1.0 | Good | 48 | >120 |
| 12 | 0.75 | 2.0 | Good | >168 | >120 |

From the above data, it can be seen that incorporation of the stabilizer mixture composed of the indicated amounts of MgO and "Paraplex G–60," into normally crystalline vinylidene chloride polymers, containing the designated amounts of the rubbery copolymer of butadiene and methyl methacrylate, produces most favorable films and other articles which are resistant to the development of odor and are essentially transparent. Additionally, none of the herein described films of the present invention showed evidence of exudation even after prolonged storage in a warm place, and were entirely satisfactory in every respect for usage as food wrappers, and particularly as wrappers for refrigerated or frozen foodstuffs.

Similar good results are obtained from any composition comprising (I) from about 70 to 95 percent by weight of the composition of a normally crystalline polymer consisting of (a) 70 to 100 percent by weight of vinylidene chloride and (b) 0 to 30 percent by weight of at least one monoethylenically unsaturated comonomer (II) from about 5 to 30 percent by weight of any of the rubber-like polymeric modifiers as described herein, and (III) from about 0.5 to 2.75 percent by weight in the aggregate, based on the total weight of the composition, of a stabilizer mixture consisting essentially of (1) from about 0.25 to 0.75 percent by weight of a compound of a metal of Group II of the Periodic Table, as defined herein, and (2) from about 0.25 to 2.0 percent by weight of an ester of a higher fatty acid containing from about 8 to 22 carbon atoms wherein the fatty acid group contains from about 2 to 10 percent epoxy oxygen, as defined herein.

What is claimed is:

1. A polymeric composition consisting essentially of a blend of (I) from 70 to 95 percent by weight of the composition of a normally crystalline polymer selected from the group consisting of polyvinylidene chloride and interpolymers of at least about 70 percent by weight of vinylidene chloride with up to about 30 percent by weight of at least one monoethylenically unsaturated comonomer, (II) from about 5 to 30 percent by weight of said composition of a rubber-like copolymer of (a) between 70 and 95 weight percent of an open chain aliphatic conjugated diolefin selected from the group consisting of butadiene and isoprene and (b) between 5 and 30 weight percent of methyl methacrylate, and (III) between about 0.50 and 2.75 percent by weight in the aggregate based on the total weight of the composition of a stabilizer mixture consisting essentially of (1) from about 0.25 to 0.75 percent by weight of magnesium oxide having an average particle size of less than about 1 micron, and (2) from about 0.25 to 2 percent by weight of an epoxidized soybean oil having an epoxy-oxygen content of at least about 6 percent.

2. The composition as claimed in claim 1 wherein said normally crystalline polymer is a copolymer of vinylidene chloride and vinyl chloride.

3. The composition as claimed in claim 1 wherein said rubber-like copolymer is a copolymer of butadiene and methyl methacrylate.

4. A polymeric composition consisting essentially of a blend of (I) about 88 percent by weight of the composition of a normally crystalline polymer consisting of (a) about 73 percent by weight of vinylidene chloride and (b) about 27 percent by weight of vinyl chloride, (II) about 12 percent by weight of the composition of a rubbery copolymer of (a) about 80 percent by weight butadiene and (b) about 20 percent by weight of methyl methacrylate, and (III) from about 0.50 to 2.75 percent by weight in the aggregate based on the total weight of the composition, of a stabilizer mixture consisting essentially of (1) from about 0.25 to 0.75 percent by weight of magnesimum oxide having an average particle size of less than about 1 micron and (2) from about 0.25 to 2.0 percent by weight of an epoxidized soybean oil having an epoxy-oxygen content of at least about 6 percent.

5. An essentially odorless, transparent and non-exuding oriented film consisting essentially of a homogeneous blend of (I) from 70 to 95 percent by weight of the composition of a normally crystalline polymer selected from the group consisting of polyvinylidene chloride and interpolymers of at least about 70 percent by weight of vinylidene chloride with up to about 30 percent by weight of at least one monoethylenically unsaturated comonomer, (II) from about 5 to 30 percent by weight of said composition of a rubber-like copolymer of (a) between about 70 and 95 weight percent of an open chain aliphatic conjugated diolefin selected from the group consisting of butadiene and isoprene and (b) between about 5 and 30 weight percent of methyl methacrylate, and (III) between about 0.50 and 2.75 percent by weight in the aggregate based on the total weight of the composition of a stabilizer mixture consisting essentially of (1) from about 0.25 to 0.75 percent by weight of magnesium oxide having an average particle size of less than about 1 micron, and (2) from about 0.25 to 2 percent by weight of an epoxidized soybean oil having an epoxy-oxygen content of at least about 6 percent.

6. The oriented film of claim 5 wherein said normally crystalline polymer is a copolymer of vinylidene chloride and vinyl chloride.

7. The oriented film of claim 5 wherein said rubber-like copolymer is a copolymer of butadiene and methyl methacrylate.

8. An essentially odorless, transparent and non-exuding oriented film consisting essentially of a homogeneous blend of (I) about 88 percent by weight of the composition of a normally crystalline polymer consisting of (a) about 73 percent by weight of vinylidene chloride and (b) about 27 percent by weight of vinyl chloride, (II) about 12 percent by weight of the composition of a rubbery copolymer of (a) about 80 percent by weight butadiene and (b) about 20 percent by weight methyl methacrylate, and (III) from about 0.50 to 2.75 percent by weight in the aggregate based on the total weight of the composition, of a stabilizer mixture consisting essentially of (1) from about 0.25 to 0.75 percent by weight of magnesium oxide having an average particle size of less than about 1 micron and (2) from about 0.25 to 2.0 percent by weight of an epoxidized soybean oil having an epoxy-oxygen content of at least 6 percent.

References Cited by the Examiner

UNITED STATES PATENTS

| | | | |
|---|---|---|---|
| 2,614,094 | 10/1952 | Wheelock | 260—890 |
| 2,658,053 | 11/1953 | Signer et al. | 260—891 |
| 2,671,064 | 3/1954 | Cowell et al. | 260—31.8 |
| 2,684,353 | 7/1954 | Greenspan et al. | |
| 2,719,137 | 9/1955 | Tawney et al. | 260—890 |
| 2,897,176 | 7/1959 | Rocky et al. | |
| 2,924,583 | 2/1960 | Starcher et al. | 260—31.8 |
| 3,033,812 | 5/1962 | Isaacs et al. | 260—31.8 |

FOREIGN PATENTS 575,994    5/1959    Canada.

ALLAN LIEBERMAN, *Acting Primary Examiner.*

MORRIS LIEBMAN, *Examiner.*

L. T. JACOBS, *Assistant Examiner.*